B. F. ST. JOHN & H. HORST.
Brick and Tile Machine.
No. 50,508.
2 Sheets—Sheet 1.
Patented Oct. 17, 1865.
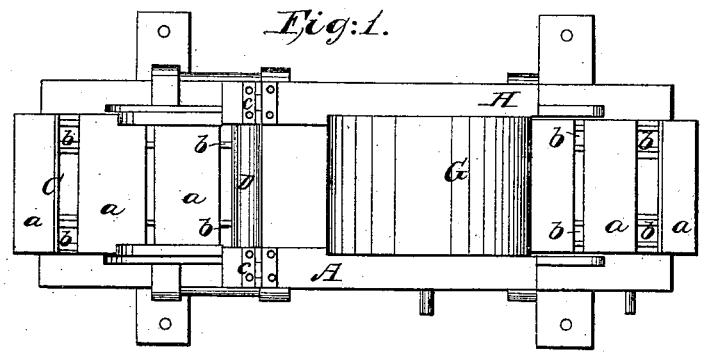
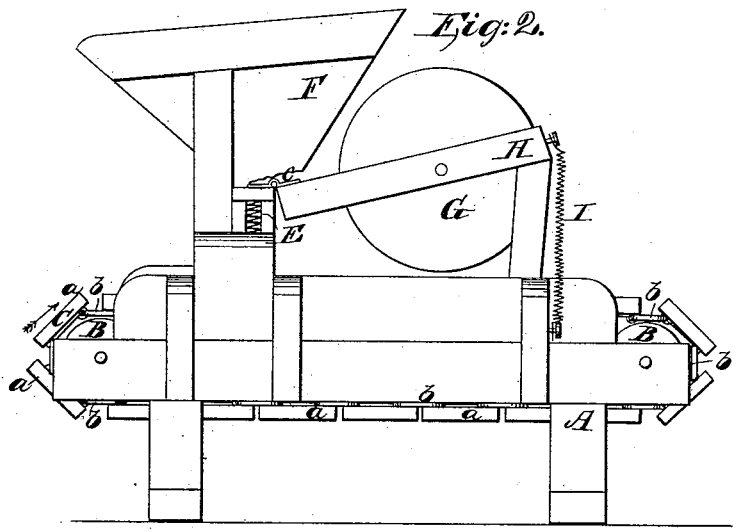
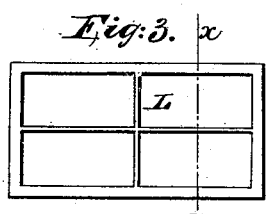
Witnesses:
Inventor:

B. F. ST. JOHN & H. HORST.
Brick and Tile Machine.
No. 50,508.
2 Sheets—Sheet 2.
Patented Oct. 17, 1865.
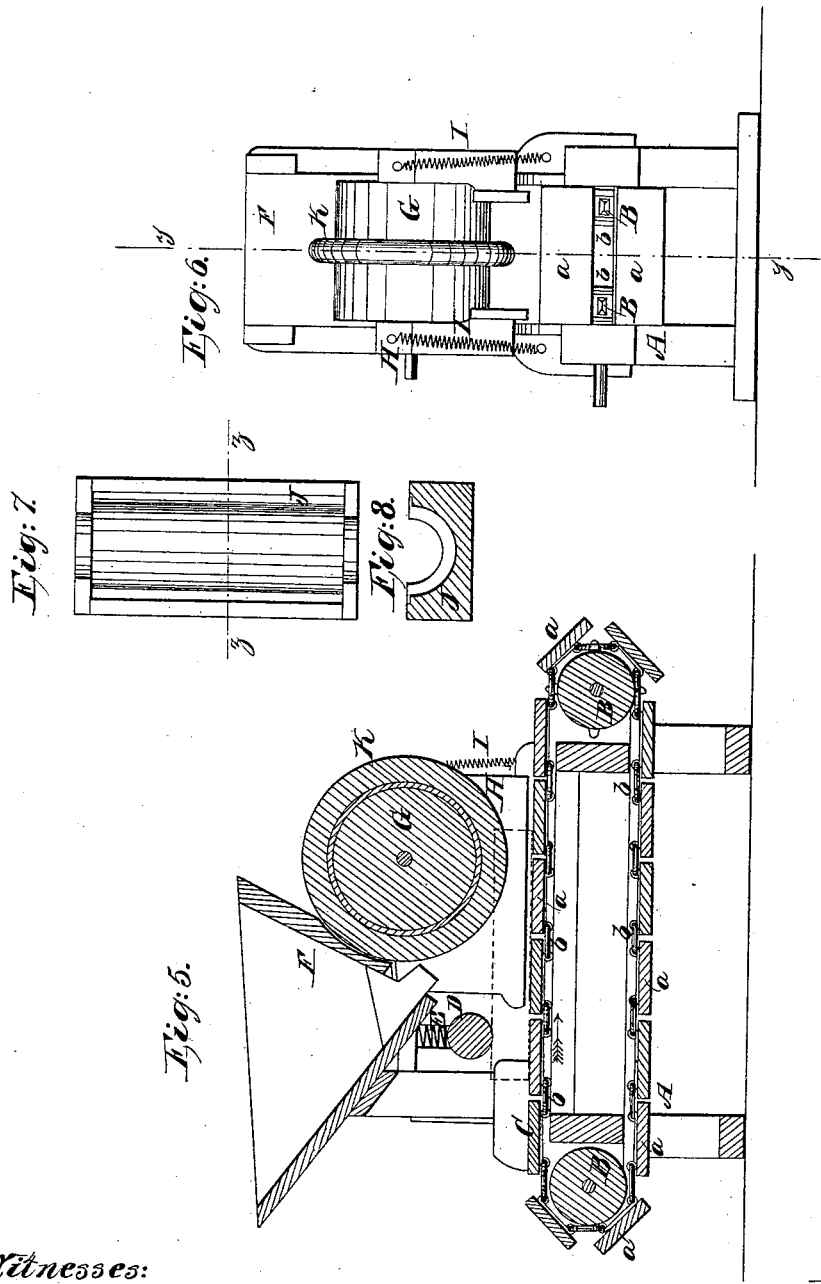
Witnesses:
Inventor:

UNITED STATES PATENT OFFICE.

B. F. ST. JOHN AND HENRY HORST, SR., OF SHELBYVILLE, INDIANA.

IMPROVED BRICK AND TILE MACHINE.

Specification forming part of Letters Patent No. 50,508, dated October 17, 1865.

*To all whom it may concern:*

Be it known that we, B. F. ST. JOHN and HENRY HORST, Sr., of Shelbyville, in the county of Shelby and State of Indiana, have invented a new and Improved Machine for Making Bricks and Tiles; and we do hereby declare that the following is a full, clear, and exact description thereof, which will enable others skilled in the art to make and use the same, reference being had to the accompanying drawings, forming part of this specification, in which—

Figure 1, Sheet No. 1, is a plan or top view of our invention with the hopper removed; Fig. 2, a side view of the same; Fig. 3, a plan or top view of a brick-mold pertaining to the same; Fig. 4, a transverse section of Fig. 3, taken in the line *x x;* Fig. 5, Sheet No. 2, a side sectional view of our invention, taken in the line *y y*, Fig. 6; Fig. 6, an end view of the same; Fig. 7, a plan or top view of a tile-mold; Fig. 8, a transverse section of Fig. 7, taken in the line *z z*.

Similar letters of reference indicate like parts.

This invention relates to a new and improved machine for making or pressing bricks and tiles; and it consists in the employment or use of an endless conveying and discharging platform and a pressure-roller arranged in connection with a hopper, in the manner substantially as hereinafter set forth.

A represents a rectangular frame, in which two rollers, B B, are placed transversely at each end, and C is an endless platform, which is composed of a series of plates or boards, *a*, connected together by links *b*, said platform working over the rollers B.

D represents a roller, which is placed in the frame A directly over the endless platform C, and has its journals in bearings which are acted upon by springs E.

F is a hopper placed on the frame A, and G is a pressure-roller the axis of which is fitted in a frame, H, one end of which is attached to the frame A by hinges *c*, and the opposite end connected by spiral springs I to the frame A.

In pressing or forming tiles which are of cylindrical form, the mold J is of semi-cylindrical form, as shown in Figs. 7 and 8, and a ring or band, K, is placed on the roller G, said ring or band being of semi-cylindrical shape in its transverse section, or forming rather more than a semi-cylinder. This ring or band forms what may be termed a "core," and gives the interior form or shape to the tile.

The operation is as follows: The endless platform C is moved in the direction indicated by the arrow 1, and the tempered clay is placed in the hopper F. The molds J are placed on the endless platform C, directly behind the roller D, said roller keeping the mold in position while receiving the clay and in passing under the roller G. The ring or band K, as the mold passes under the roller D, gives the interior form to the half-tile.

In pressing bricks the ordinary brick-mold, L, is used, as shown in Figs. 4 and 5, and the ring or band K removed from the roller D, as shown in Figs. 1 and 2. The pressure of the roller D and ring or band K is due to the springs I.

The whole arrangement is extremely simple and efficient.

Having thus described our invention, what we claim as new, and desire to secure by Letters Patent, is—

The endless conveying and discharging platform C, in connection with the holding or retaining roller D, the hopper F, and the pressure-roller G, both with and without the ring or band K, substantially as and for the purpose herein set forth.

B. F. ST. JOHN.
HENRY HORST, SR.

Witnesses:
Z. N. SMITH,
MATTHIAS WRIGHT.